Feb. 1, 1927.
S. J. TELLER ET AL
1,616,150
WORK SUPPORT
Filed May 2, 1923
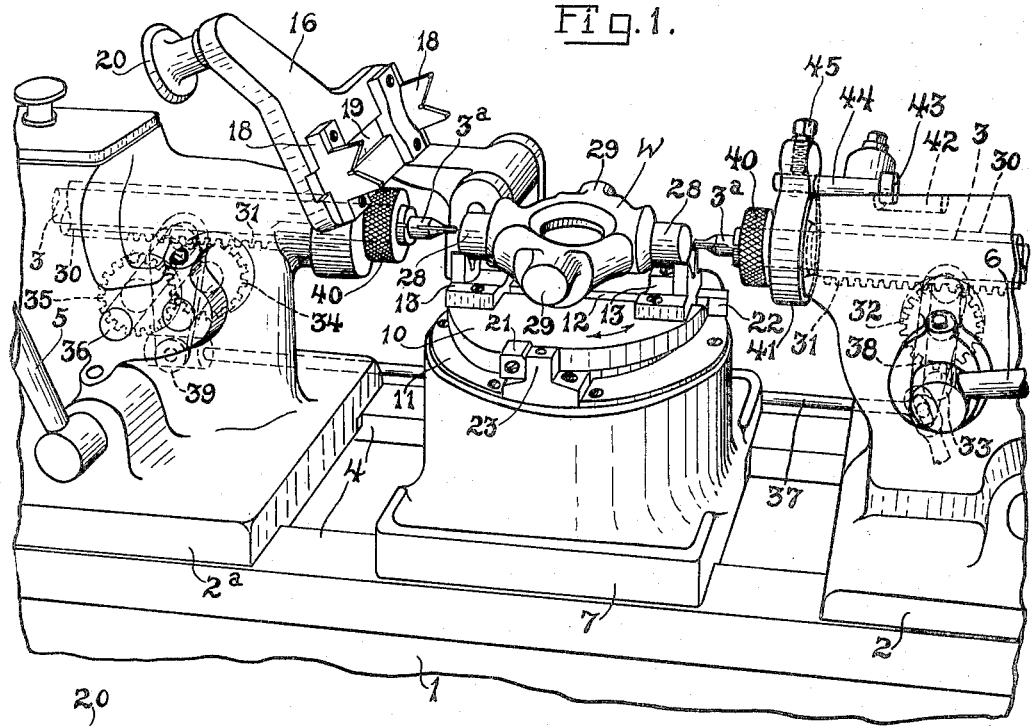
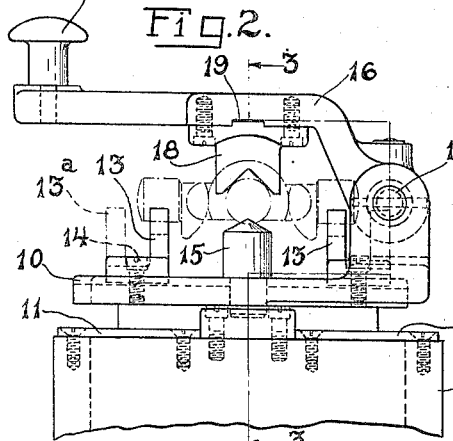
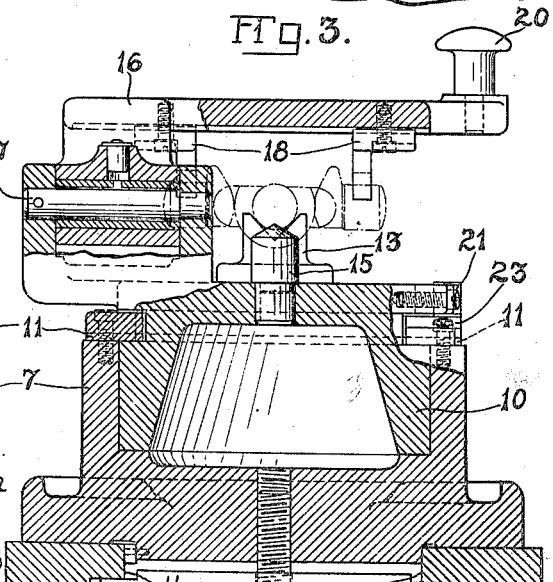
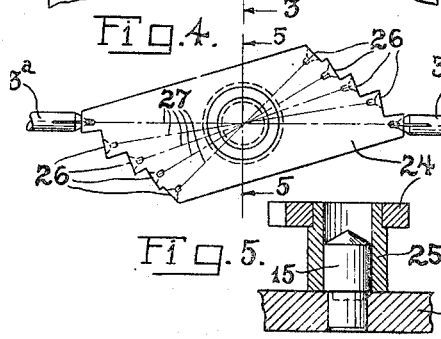
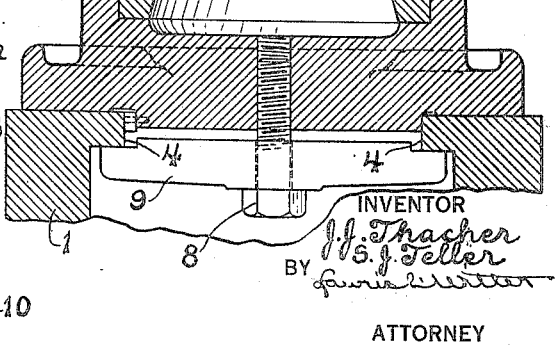
INVENTOR
J. J. Thacher
S. J. Teller
BY
ATTORNEY Patented Feb. 1, 1927.

1,616,150

UNITED STATES PATENT OFFICE.

SPENCER JAY TELLER, OF HARTFORD, AND JOHN J. THACHER, OF WETHERSFIELD, CONNECTICUT, ASSIGNORS TO PRATT & WHITNEY COMPANY, OF NEW YORK, N. Y., A CORPORATION OF NEW JERSEY.

WORK SUPPORT.

Application filed May 2, 1923. Serial No. 636,237.

This invention relates to work supports and more particularly to improved means for locating and supporting a work piece in operative position relative to a spindle or spindles and for readily indexing the work support and work to another tooling position. The primary object of the invention is to provide an improved manually operable device for performing these functions.

As shown in the drawing, our invention relates to or may be used in connection with center drilling machines. It is an object of the invention to provide an improved work holder having manually operable means, including two pairs of spaced work engaging jaws on the holder, adapted to readily and accurately center a work piece in axial alignment with and midway between the drill spindles and to hold such piece in position for the drilling or other operation.

Another object of the invention is to provide a gaging plate in connection with the work support and tool spindles whereby the spindles may be accurately adjusted to the proper operating position relative to the holding fixture prior to the operation thereof on a work piece.

With the above and other objects in view, our invention consists in the features of construction and operation set forth in the following specification and illustrated in the accompanying drawing. In such drawing annexed hereto and forming a part of this specification we have shown one embodiment of our invention but it will be understood that the invention can be otherwise embodied and that the drawing is not to be construed as defining or limiting the scope of the invention, the claims appended to this specification being relied upon for that purpose. In this drawing we have shown our invention embodied in a specific form of fixture or work holder for a piece required to be indexed to two angular positions, but, it will be understood that the invention can be otherwise embodied in accordance with the form of the work and the operations to be performed thereon.

Referring to the figures of the drawing:

Figure 1 is a fragmentary perspective view of a center drilling machine embodying our invention.

Fig. 2 is a side elevation of the work holder.

Fig. 3 is a vertical sectional view thereof taken approximately on line 3—3 of Fig. 2.

Fig. 4 is a plan view of a gaging plate used in connection with the work holder and tool spindles.

Fig. 5 is a vertical sectional view taken on line 5—5 of Fig. 4.

As illustrated in the drawing, the piece of work W is to have its four relatively right angular outer extremities center-drilled. Such piece of work illustrated is a universal joint spider but it should be understood, however, that the invention is applicable also to other parts for differential mechanisms, steering knuckles for automobiles, and similar pieces. The present invention provides a device for readily and accurately centering the piece W midway between and in axial alignment with the drill spindles in in a manner to drill two of the extremities also for thereafter quickly indexing the work holder to place the piece in position to have the other two extremities drilled. It should be particularly noted that all movements of the parts of the work holder are adapted to be performed by a single handle, thereby leaving the operator's other hand free to feed the drill spindles. The specific mechanism illustrated in the drawing will now be described.

In the drawing, 1 indicates the bed of a center drilling machine provided thereon with headstocks 2 and 2ª having drill spindles 3 therein. The headstock 2ª is adjustably mounted on the ways 4 of the bed and is provided with a handle 5 for clamping the same thereto. A handle 6 is provided for simultaneously moving both drill spindles inwardly toward the work. This mechanism is specifically illustrated and described in the patent of J. J. Thacher, one of the applicants, No. 1,469,368 granted October 2, 1923.

A work support is mounted on the ways 4 of the bed 1 between the headstocks. This support comprises a base 7 adapted to be secured to the bed by means of a bolt 8 and a clamping piece 9. Rotatably mounted in the base 7 is the work support proper 10, plates 11 being provided for holding the same therein.

The upper surface of the support 10 is grooved diametrically at 12 for receiving a pair of work supporting jaws 13 therein, screws 14 being provided for holding the jaws in place. A pin 15 is also provided at the center of rotation of the support 10 for a purpose to be hereinafter described. An element 16 is pivoted to the support 10 at 17 so that it may be swung into and out of operative position and a pair of work engaging jaws 18 are adjustably mounted in a groove 19 in this element. An operating handle 20 is provided on the element 16. It will be noted that the jaws 13 are adapted to receive and support the work on one diameter thereof and the jaws 18 on the swinging member 16 are adapted to engage the work on another diameter between and remote from the jaws 13. In the work gripping position, the jaws 13 are in one vertical plane and the jaws 18 are in another vertical plane disposed at right angles to the first.

The work support 10 is provided with a pair of lugs 21 and 22 thereon spaced 90° apart and adapted to engage respectively opposite sides of a lug 23 secured to the base 7. Thus, as illustrated in Fig. 1, when the lug 21 is in engagement with the lug 23, the jaws 13 are in the vertical plane of the spindles 3. Rotation of the support to engage the lug 22 with the lug 23, places the jaws 18 in the vertical plane of the spindles (the jaws 18 being in the work gripping position).

In Figs. 4 and 5 is illustrated a gaging plate 24 adapted to cooperate with the work support and spindles for accurately setting the latter and the drills therein in the proper drilling position prior to the drilling operation. This plate 24 is mounted on a bushing 25 adapted to seat over the pin 15. The ends of the plate are stepped at 26 to provide a series of different length axes 27 extending therethrough. Each step 26 is also countersunk to receive the ends of the drills 3ª. It will be understood that by placing this plate over the pin 15 prior to the drilling operation, the drills and spindle stop mechanism hereinafter described may be accurately adjusted longitudinally whereby to thereafter drill the work to the desired depth. After setting the same, the plate may be removed and the work mounted in the jaws as illustrated in Fig. 1.

The spindle feeding mechanism operated from the handle 6 and which is more fully illustrated and described in our beforementioned application, broadly comprises the following: Each drill spindle 3 is rotatably mounted within a sleeve 30 slidable longitudinally within its headstock. Each sleeve is provided with rack teeth 31 to be engaged by an operating pinion. A pinion 32 on the shaft 33 on which the handle 6 is mounted is in mesh with the rack teeth on the sleeve in the headstock 2. A pinion 34 is in mesh with the rack teeth on the sleeve in the headstock 2ª and is also in mesh with a pinion 35 on a shaft 36. A rod 37 operatively connects two crank arms 38 and 39 respectively on the rear ends of the shafts 33 and 36. By means of this mechanism it will be seen that movement of the handle 6 operates to simultaneously feed both drill spindles inwardly toward the work or to withdraw the same therefrom. The inner end of each spindle is provided with a collet 40 for adjustably securing the drilling tool 3ª to the spindle.

Adjustable stop means for limiting the inward movement of the spindles and therefore the depth of drilling is provided as follows: The inner end of the sleeve 30 in the headstock 2 has a collar 41 preferably integral therewith. The headstock 2 is provided with a longitudinally extending recess 42 therein for receiving the head 43 of a bolt 44 adjustably mounted within the collar. A set screw 45 is provided for securing the bolt 44 in its adjusted position. The engagement of the head 43 with the inner end of the recess 42 limits the inward movement of both spindles, such spindles being interconnected as heretofore described.

The gaging plate 24 serves two functions. First the same operates as means for accurately setting the two drills 3ª the same distance from the center of the work holder whereby both will operate to drill to the same depth in the work piece. It will be understood that the collet 40 permits longitudinal adjustment of the drills in the spindles. Second, the gaging plate serves as a means for accurately setting the spindle stop mechanism whereby the movement of the drill spindles is limited to drill only to the desired depth. This adjustment may be made by means of the set screw 45.

The operation of the mechanism is as follows: The headstock 2ª and the base 7 are first properly adjusted on and secured to the bed 1. The drills 3ª and the spindle stop mechanism are then adjusted and set in their proper position to drill to the desired depth. The gaging plate 24 is then removed and the piece W placed in the jaws 13 as illustrated in Fig. 1. The work piece illustrated in the drawing is a universal joint spider and comprises four extremities 28 and 29 to be center drilled, the extremities 28 being on one diameter of the work piece and the extremities 29 being on a relatively right-angular diameter thereof. As illustrated in Fig. 1, the ends 28 are supported in the jaws 13 in alignment with the drill spindles. The operator grasps the handle 20 in his left hand and swings the element 16 downwardly to engage the jaws 18 with the ends 29. The jaws 18 accurately locate the work in the holder on said relatively right angular diameter which locates the work piece midway between the drills 3ª. While holding the work piece thus secured between the two pairs of jaws, the operator grasps the handle 6 with his right hand and simultaneously moves the drill spindles inwardly to center drill the ends 28. He thereafter moves the drill spindles back and rotates the holder 10 to engage the stop 22 with the stop 23. This action rotates or indexes the work W through one half a revolution and places the ends 29 in accurate alignment with and midway between the drill spindles. The drill spindles are now again brought forward to center drill such ends. The work holder therefore operates to accurately locate and secure the work piece in predetermined position for drilling and to quickly and accurately index the same to place the piece in position for the second drilling operation.

It should be noted that the work engaging jaws 13 and 18 are L-shaped whereby the same may be reversed from the position shown in full lines at 13 in Fig. 2 to the position shown in dot and dash lines at 13ᵃ. Such adjustment of the jaws provides for operating on either relatively short or long work pieces.

What we claim is:

1. A work holder comprising the combination of a pair of spaced work receiving and supporting jaws, and an element movably mounted on the holder and having a second pair of cooperating jaws adapted to engage a work piece to locate and hold the same seated in the first jaws, the first jaws being adapted to locate the work piece against movement in one direction, the second jaws being located in a vertical plane outside the vertical plane through the first pair of jaws and being adapted to locate the work piece against movement in a relatively angular direction, and both pairs of jaws cooperating to hold the piece secured therebetween.

2. A work holder comprising the combination of a pair of spaced jaws adapted to engage one side of a work piece, and means including a second pair of cooperating jaws pivotally mounted on the holder and adapted to engage the other side of the work piece to locate and hold the same seated in the first jaws, the first jaws being in one vertical plane and the second named jaws being in a vertical plane at an angle relative to the first jaws when in the work gripping position.

3. A work holder comprising the combination of a support, a pair of spaced V-shaped jaws thereon adapted to engage one side of a work piece, and means including a second pair of co-operating V-shaped jaws movably mounted on the support and adapted to engage the opposite side of the work, one pair of jaws being between and in a plane at right angles to the plane of the other pair of jaws whereby the first pair locate the work in one direction and the other pair locates the work in a direction at right angles thereto.

4. A work holder comprising the combination of a support, jaw means thereon for receiving a work piece, cooperating jaw means movably mounted on the support and adapted to engage the opposite side of the work to hold the same for a tooling operation, the work engaging portion of one jaw means being angularly disposed to the work engaging portion of the other jaw means whereby one jaw means locates the work in one direction and the other jaw means locates the work in a direction at an angle thereto, and means for indexing the work holder through an angle equal to the angle between the two said jaw means whereby to place the work in different tooling positions.

5. A work holder comprising the combination of a support, a pair of jaws thereon for receiving a work piece, means including a second pair of jaws movably mounted on the support and adapted to engage the work to hold the same in the first mentioned jaws in position for a tooling operation thereon, the first said jaws being adapted to locate the work in one direction and the second jaws being adapted to locate the work in a direction at an angle thereto, and means for indexing the work holder to place the work in different tooling positions.

6. A work holder comprising the combination of a support, a pair of spaced V-shaped jaws thereon adapted to engage one side of a work piece, means including a second pair of co-operating V-shaped jaws movably mounted on the support and adapted to engage the opposite side of the work, one pair of jaws being between and in a plane at right angles to the plane of the other pair of jaws whereby the first pair locate the work in one direction and the other pair locates the work in a direction at right angles thereto, and means for indexing the work holder 90° to place the work in different tooling positions.

7. In combination, a base, a work support rotatably mounted thereon, a pair of spaced jaws on the support adapted to receive a work piece, means including a second pair of jaws movably mounted on the support and adapted to engage the work to locate and hold the same in the first mentioned jaws in position for a tooling operation thereon, the first of said jaws being adapted to locate the work in one direction and the second jaws being adapted to locate the work in a direction at an angle thereto, and stop means for limiting the rotation of the support whereby the same may be readily indexed through an angle equal to the angle between the said relative angular work locating directions.

8. In a machine tool, the combination of a bed, a rotary tool spindle supported thereon, a work support rotatably supported on the bed adjacent the spindle, work receiving jaw means on the support, cooperating jaw means movably mounted on the support and adapted to engage the opposite side of the work, the said jaw means being adapted to cooperate to locate the work in two relatively angular directions and hold the same in tooling position relative to the spindle, stop means for limiting the rotation of the work holding means whereby the same may be readily indexed to different definite tooling positions, and a single handle for manually operating the cooperating jaw means and indexing the support.

9. In a machine tool, the combination of a bed, a rotary tool spindle supported thereon, adjustable stop means for limiting the inward feeding movement of the spindle, a work support on the bed adjacent the spindle, work receiving and securing means on the support, and a gaging element adapted to cooperate with the support and spindle for accurately setting the stop means prior to the tooling operation, the element and support having cooperating means for definitely locating the element on the support.

10. In a machine tool, the combination of a bed, a pair of drill spindles supported thereon and each adapted to receive a drilling tool therein, a work support on the bed between the spindles, work receiving and securing means on the support, unitary means for simultaneously moving both spindles longitudinally toward and from the support, and a gaging plate adapted to cooperate with the support and drills for accurately setting the drills to their proper operating position longitudinally in the spindles prior to the operation thereof on the work, the plate and support having cooperating means for definitely locating the plate on the support.

11. In a machine tool, the combination of a bed, a pair of drill spindles supported thereon, a work support on the bed between the spindles, work receiving and securing means on the support, unitary means for simultaneously moving both spindles longitudinally toward and from the support, adjustable stop means for limiting the inward feeding movement of the spindles, and a gaging plate adapted to cooperate with the support and spindles for accurately setting the stop means prior to the tooling operation, the plate and support having cooperating means for definitely locating the plate on the support.

In testimony whereof, we hereto affix our signatures.

SPENCER JAY TELLER.
JOHN J. THACHER.